United States Patent
Li

(10) Patent No.: US 7,136,227 B2
(45) Date of Patent: Nov. 14, 2006

(54) FRESNEL ZONE PLATE BASED ON ELASTIC MATERIALS

(75) Inventor: Ming Li, Chelmsford, MA (US)

(73) Assignee: Matsushita Electric Industrial Co., Ltd., Osaka (JP)

(*) Notice: Subject to any disclaimer, the term of this patent is extended or adjusted under 35 U.S.C. 154(b) by 278 days.

(21) Appl. No.: 10/912,886

(22) Filed: Aug. 6, 2004

(65) Prior Publication Data

US 2006/0028728 A1 Feb. 9, 2006

(51) Int. Cl.
*G02B 5/18* (2006.01)

(52) U.S. Cl. .................. 359/573; 359/569; 359/565

(58) Field of Classification Search .............. 359/573, 359/569, 572, 565
See application file for complete search history.

(56) References Cited

U.S. PATENT DOCUMENTS

| 4,909,626 A | | 3/1990 | Purvis et al. | |
|---|---|---|---|---|
| 5,360,973 A | * | 11/1994 | Webb | 250/370.01 |
| 2003/0107789 A1 | * | 6/2003 | Hishioka | 359/223 |
| 2005/0117223 A1 | * | 6/2005 | Bi | 359/578 |

FOREIGN PATENT DOCUMENTS

| EP | 0 688 062 B1 | 7/2001 |
|---|---|---|
| JP | 11027035 | 1/1999 |
| WO | WO 88/10521 | 12/1988 |
| WO | WO 90/07199 | 6/1990 |

\* cited by examiner

*Primary Examiner*—Fayez G. Assaf
(74) *Attorney, Agent, or Firm*—RatnerPrestia

(57) ABSTRACT

A dynamically variable, amplitude grating based diffractive optic including: a substantially transmissive, elastic substrate; a substantially opaque, elastic material formed in a predetermined pattern on the first surface of the elastic substrate; and a substrate mount coupled to the elastic substrate to hold it under tension. The predetermined pattern of the substantially opaque, elastic material substrate forms an amplitude grating on the elastic substrate. The substrate mount includes a variable tensioner to stretch the elastic substrate and the substantially opaque, elastic material, thereby allowing at least one optical property of the amplitude grating to be dynamically varied. Alternatively, the elastic substrate may include at least one substantially transparent portion and at least one substantially opaque portion, the substantially opaque portion(s) arranged in a predetermined pattern to form the amplitude grating within the elastic substrate rather than on its surface.

21 Claims, 10 Drawing Sheets

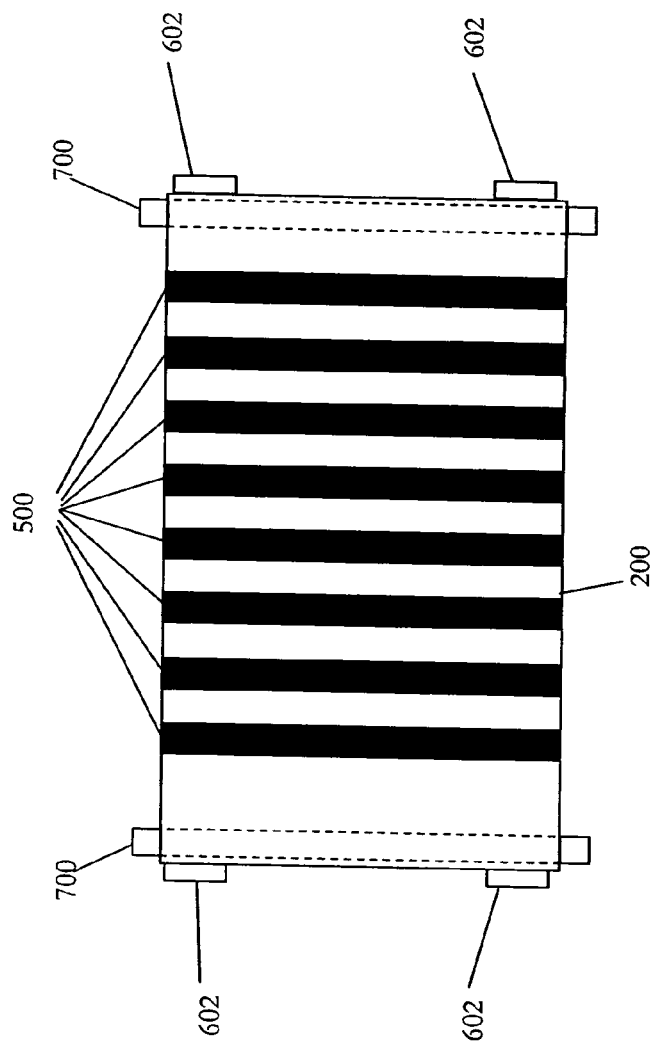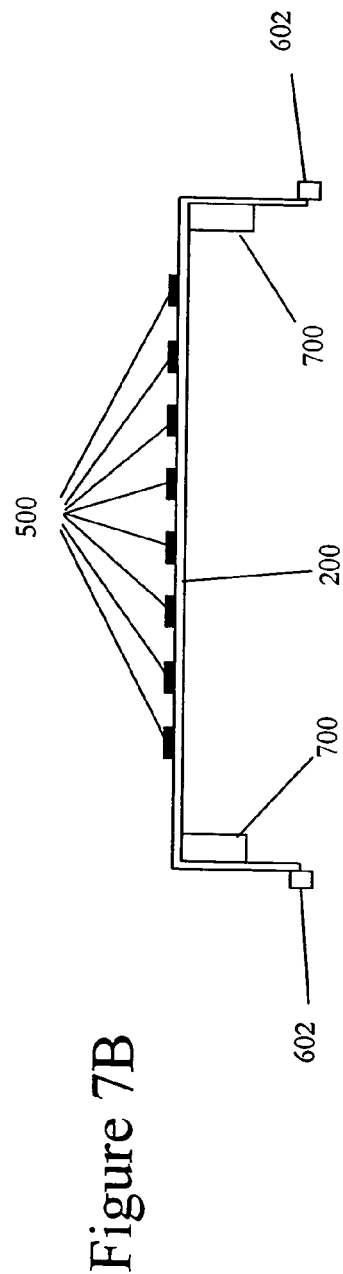
Figure 7A
Figure 7B

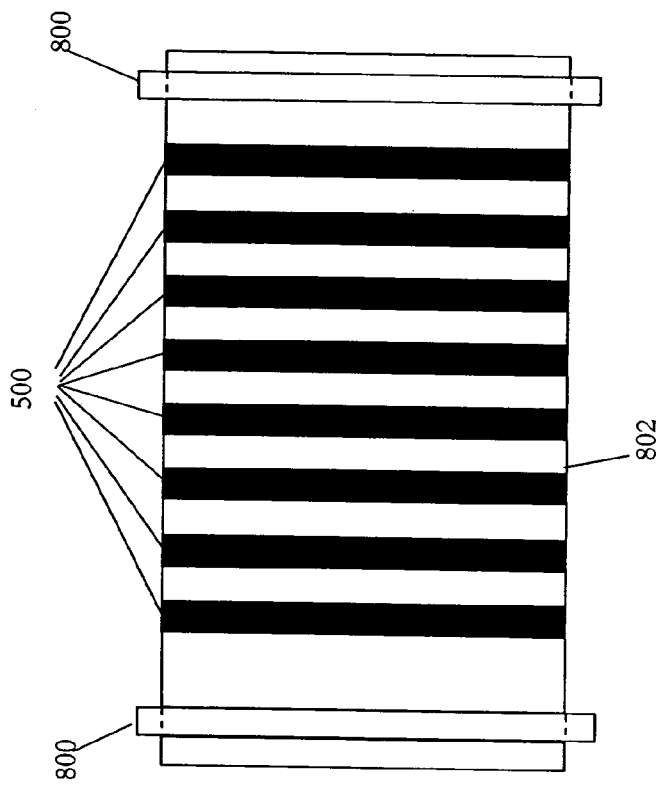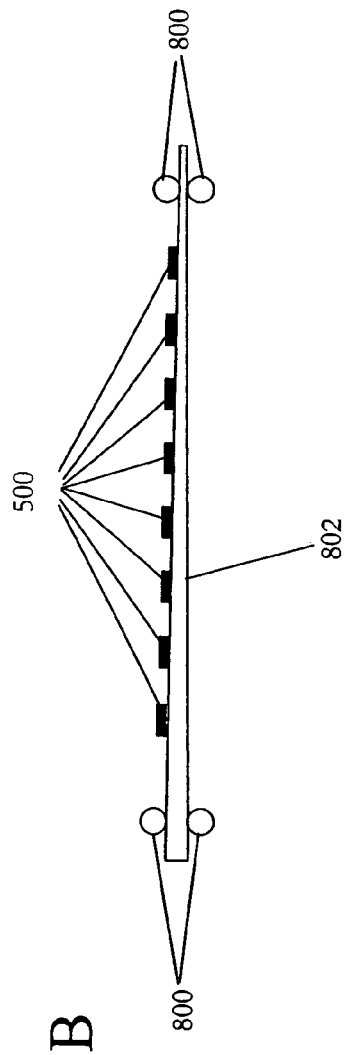
Figure 8A
Figure 8B

FRESNEL ZONE PLATE BASED ON ELASTIC MATERIALS

FIELD OF THE INVENTION

The present invention concerns an elastic Fresnel zone plate. This elastic Fresnel zone plate may also allow for thin, dynamically adjustable optics.

BACKGROUND OF THE INVENTION

As products that include optical components become smaller and smaller, there is increased demand for smaller optical devices such as diffractive optics. One of the simplest forms of diffractive optics is amplitude gratings, which are simply based on the application of Huygens's principle to a light beam. FIG. 1 illustrates a two dimensional Fresnel zone plate based on amplitude grating 102, which is formed on substrate 100. Substrate 100 is substantially transmissive to incident light 104, which is show in FIG. 1 as being monochromatic with a wavelength of λ, and the concentric annular regions of amplitude grating 102 are substantially opaque to incident light 104. The concentric annular regions, or rings, of amplitude grating 102 are sized and arranged in a predetermined pattern on the substrate surface to produce a desired diffraction pattern, which focuses a portion of incident light 104 to focal spot 106. Thus, the two dimensional Fresnel zone plate may act as a diffractive lens. Although diffractive lenses of this sort have relatively low efficiency and large chromatic aberrations, they are easy to produce and may be very compact, particularly when compared to refractive lenses.

SUMMARY OF THE INVENTION

An exemplary embodiment of the present invention is a dynamically variable, amplitude grating based diffractive optic including: a substantially transmissive, elastic substrate; a substantially opaque, elastic material formed in a predetermined pattern on the first surface of the elastic substrate; and a substrate mount coupled to the elastic substrate to hold it under tension. The predetermined pattern of the substantially opaque, elastic material substrate forms an amplitude grating on the elastic substrate. The substrate mount includes a variable tensioner to stretch the elastic substrate and the substantially opaque, elastic material, thereby allowing at least one optical property of the amplitude grating to be dynamically varied.

Another exemplary embodiment of the present invention is a dynamically variable, amplitude grating based diffractive optic including: an elastic substrate; and a substrate mount coupled to the elastic substrate to hold the elastic substrate under tension. The elastic substrate includes at least one substantially transparent portion and at least one substantially opaque portion, the substantially opaque portion(s) arranged in a predetermined pattern to form an amplitude grating. The substrate mount includes a variable tensioner to stretch the elastic substrate, thereby allowing at least one optical property of the amplitude grating to be dynamically varied.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawing are the following figures:

FIG. 7A is a front plan drawing of an exemplary elastic diffraction grating and substrate mount frame illustrating an alternative exemplary variable tensioner according to the present invention.

FIG. 7B is a bottom plan drawing of the exemplary elastic diffraction grating and substrate mount frame of FIG. 7A.

FIG. 8A is a front plan drawing of an exemplary elastic diffraction grating and another alternative exemplary variable tensioner according to the present invention.

FIG. 8B is a bottom plan drawing of an exemplary elastic diffraction grating and another alternative exemplary variable tensioner according to the present invention.

DETAILED DESCRIPTION OF THE INVENTION

The present invention involves the use of amplitude gratings formed on elastic substrates to produce compact diffractive optics with variable optic characteristics, such as variable focal length diffractive lenses, variable grating period optical gratings, elliptical lenses with variable ellipticities, adaptive optics lenses, and variable amplitude masks that may be dynamically resized or distorted.

Figure 1:
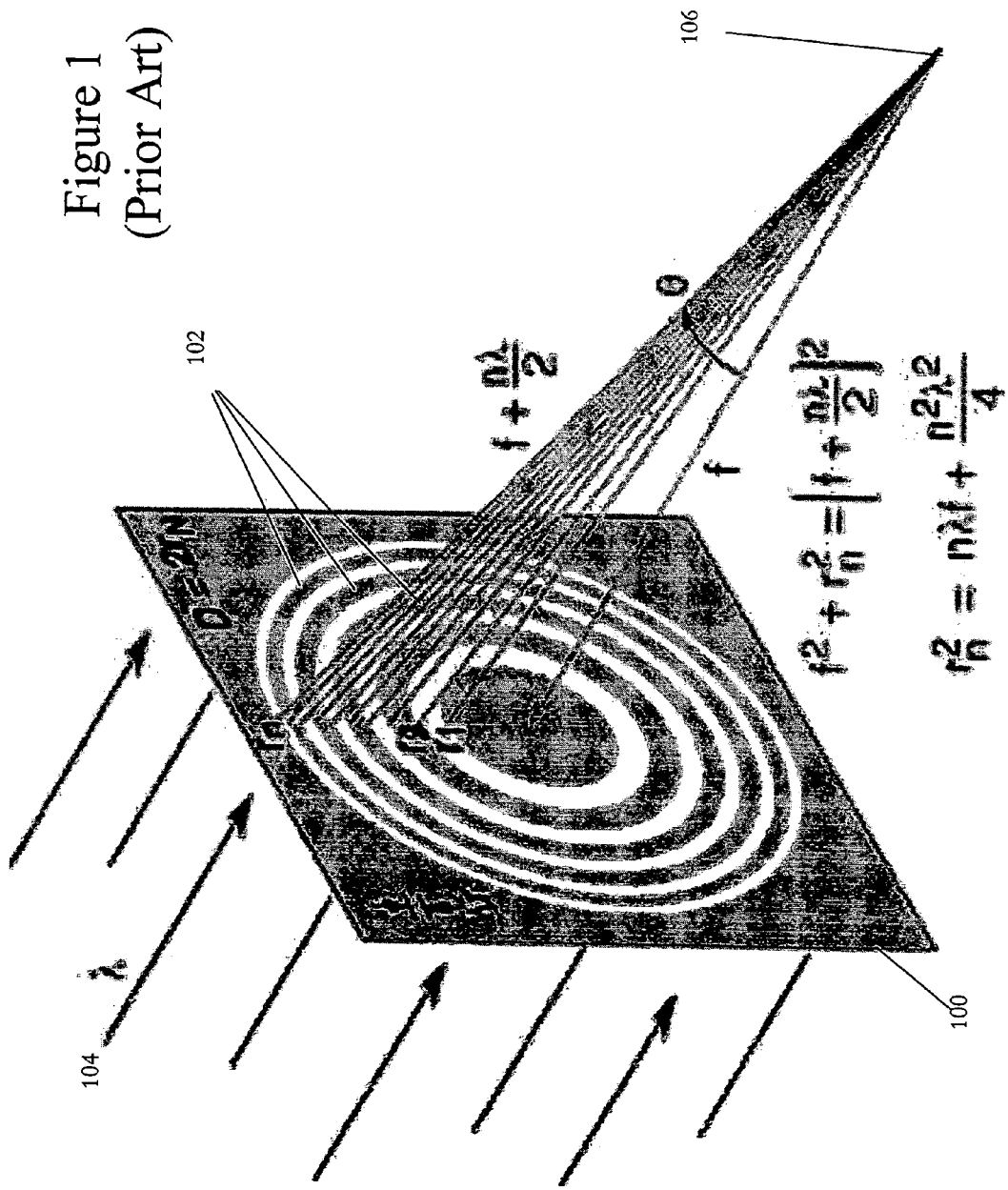
FIG. 1 is a perspective drawing of an exemplary two dimensional Fresnel zone plate according to the present invention.
Figure 2:
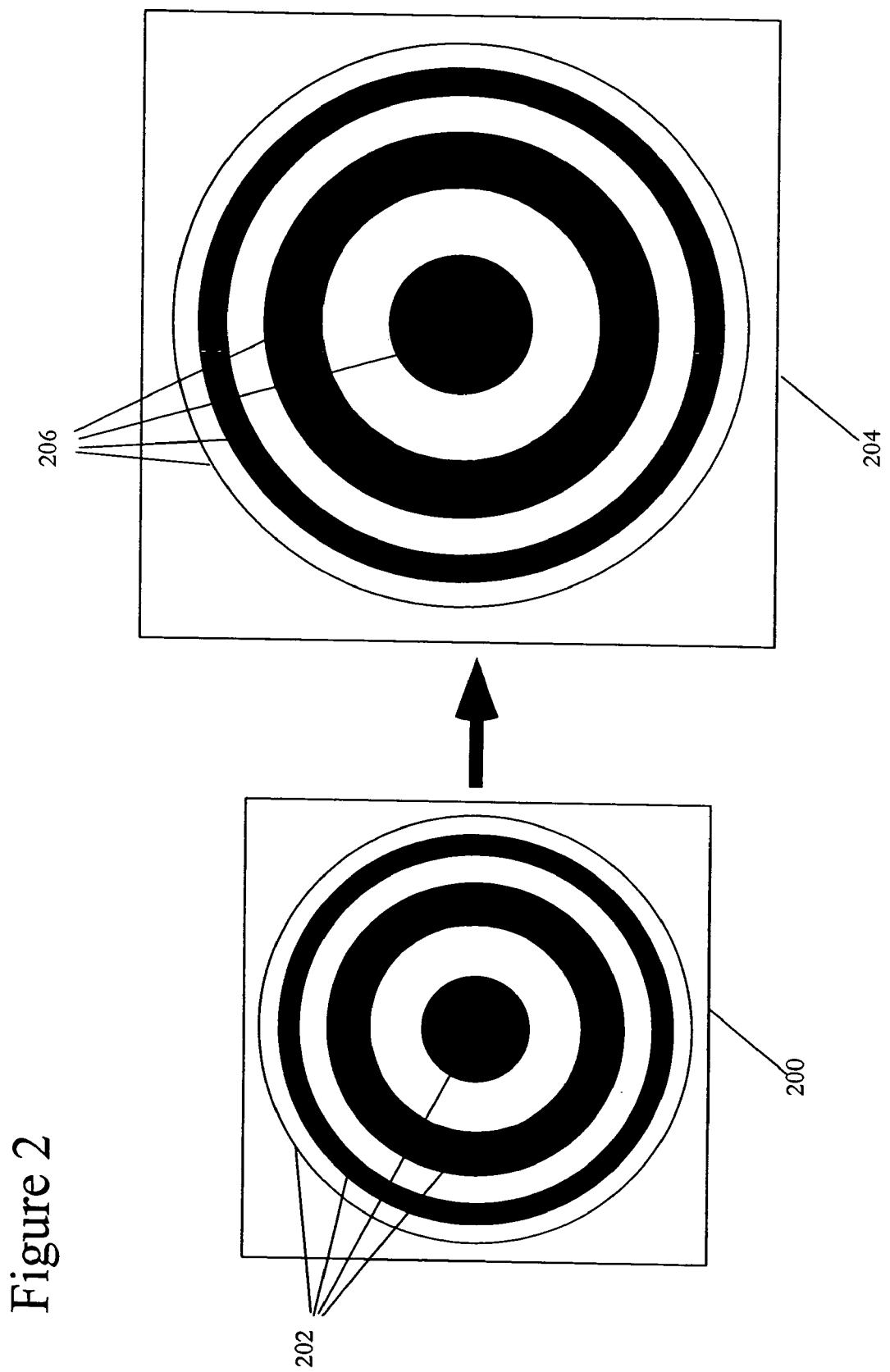
FIG. 2 is a front plan drawing of an exemplary elastic two dimensional Fresnel zone plate illustrating how it may be expanded along both the X and Y axes.

The first exemplary embodiment of the present invention is a variable focal length, and/or variable wavelength, two dimensional Fresnel zone plate as shown FIG. 2. Referring to the prior art two dimensional Fresnel zone plate shown in FIG. 1, the radii, $r_n$, of the rings of amplitude grating 102 (or width the lines of the amplitude grating of a one dimensional Fresnel zone plate) used to focus a given wavelength, λ, at a given focal length, f, may be determined by Pythagorean theorem. The equations shown in FIG. 1 illustrate the derivation of Equation 1.

$$r_n^2 = n\lambda \left( f + \frac{n\lambda}{4} \right) \quad (1)$$

As long as the largest ring, $n_{max}$, of the two dimensional Fresnel zone plate is small enough that $$f \gg \frac{n_{max}\lambda}{4},$$

Equation 1 may be reduced to:

$$r_n^2 \approx n\lambda f \quad (2)$$

In practice, meeting the condition, $$f \gg \frac{n_{max}\lambda}{4},$$

is usually not difficult and, as long as this condition is met, Equation 2 demonstrates that the radii of the rings of a two dimensional Fresnel zone plate are all proportional to the radius of the first ring. Thus, if the radii of all of the rings of a two dimensional Fresnel zone plate are doubled, the resulting amplitude grating is a two dimensional Fresnel zone plate as well.

FIG. 2 illustrates an exemplary variable focal length (and/or variable wavelength) two dimensional Fresnel zone plate. Before stretching, unstretched elastic amplitude grating 202, which is formed on unstretched elastic substrate 200, makes up a first two dimensional Fresnel zone plate, with an initial focal length for a given wavelength. FIG. 2 also illustrates how the substrate may be stretched so that two dimensionally stretched elastic substrate 204 and two dimensionally stretched elastic amplitude grating 206 form a new two dimensional Fresnel zone plate, with a new longer focal length for the given wavelength. Alternatively, this new two dimensional Fresnel zone plate may be viewed as having the same focal length as initially, but being optimized for a new longer wavelength.

Figure 3:
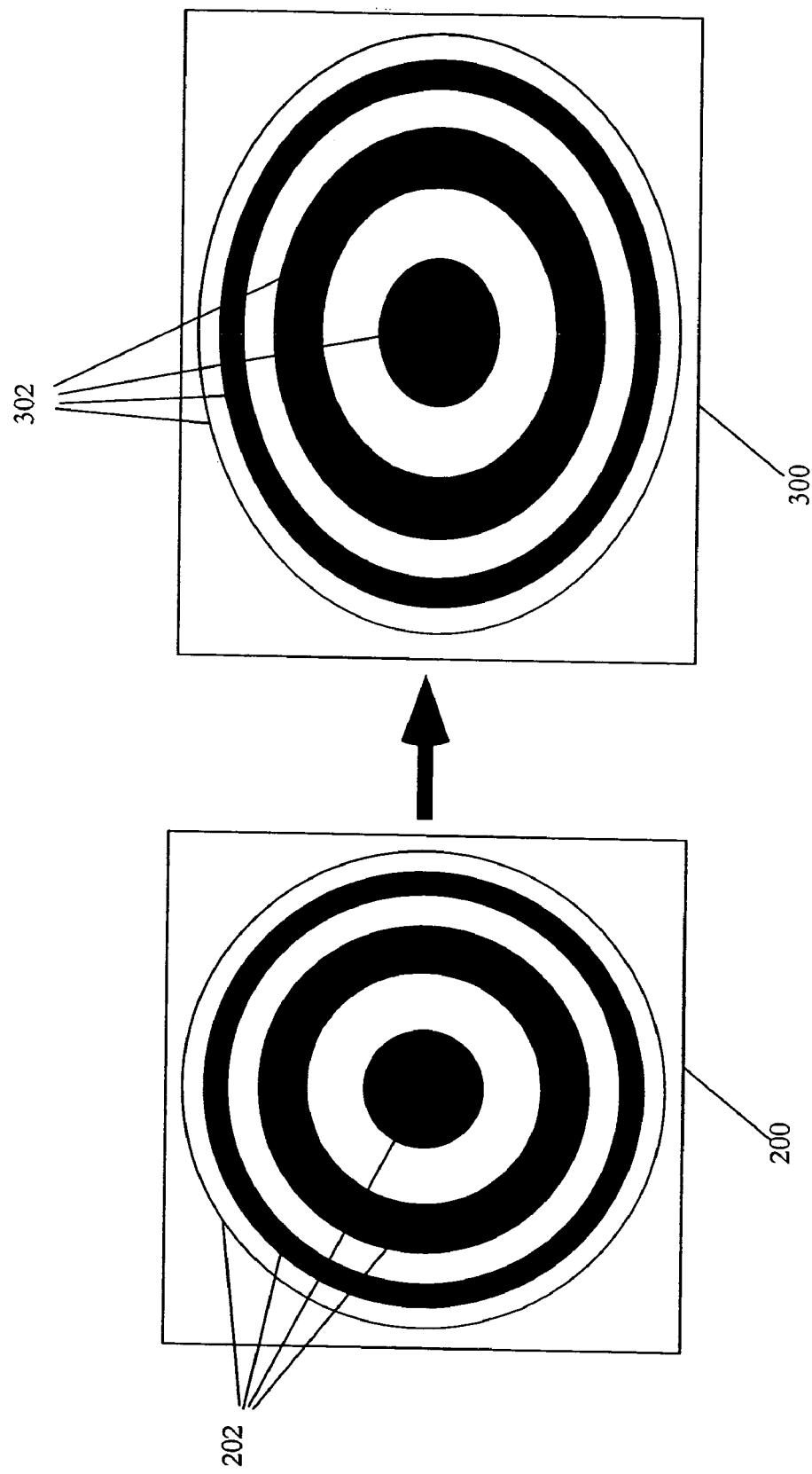
FIG. 3 is a front plan drawing of an exemplary elastic two dimensional Fresnel zone plate illustrating how it may be expanded along only the X axis.

FIG. 3 illustrates how stretching the original unstretched two dimensional Fresnel zone plate in only one dimension may desirably lead to one dimensionally stretched elastic substrate 204 and one dimensionally stretched elastic amplitude grating 206 forming on another variable diffractive optic, in this case an elliptical lens with a variable ellipticity. This sort of variable lens may be desirable for collimating a beam with unequal angular dispersion, such as diode laser or the output of a planar waveguide.

Elastic substrate 200 (and 204 and 300) is desirably a substantially transmissive, elastic polymer sheet, such as: polypropylene film; impact modified polypropylene film; polyvinylchloride film; polyethylene film; polyurethane film; melt processible rubber film; thermoplastic vulcanate film; thermoplastic copolyester film; thermoplastic polyamide film; ethylene vinyl acetate film; or styrene block copolymer film.

Elastic amplitude grating 202 (and 206 and 302) is desirably formed on the surface of the elastic substrate out of a substantially opaque, elastic material, such as: ink; photoresist; epoxy; elastomer; rubber; resin; or thermoplastic. The elastic amplitude grating may be formed on the surface of the elastic substrate by any one of a number of methods, such as printing or screening, or by depositing the elastic amplitude grating over the entire substrate surface and etching portions away. It may be desirably for the elastic amplitude grating to be more easily stretched than the elastic substrate. If the elastic amplitude grating is too difficult to stretch, then the pattern formed by the elastic amplitude grating may become distorted during larger stretches and the range of variability of the diffractive optic device may be reduced. It is noted that the exemplary substantially annular amplitude gratings 202 (and 206 and 302) in the embodiments of FIGS. 2 and 3 may be designed to form aspherical diffractive lenses, as well.

It is noted that the exemplary dynamically variable, amplitude grating based diffractive optics shown in FIGS. 4, 5, 9, and 10 may desirable be formed in the same manner as those of FIGS. 2 and 3.

Figure 10:
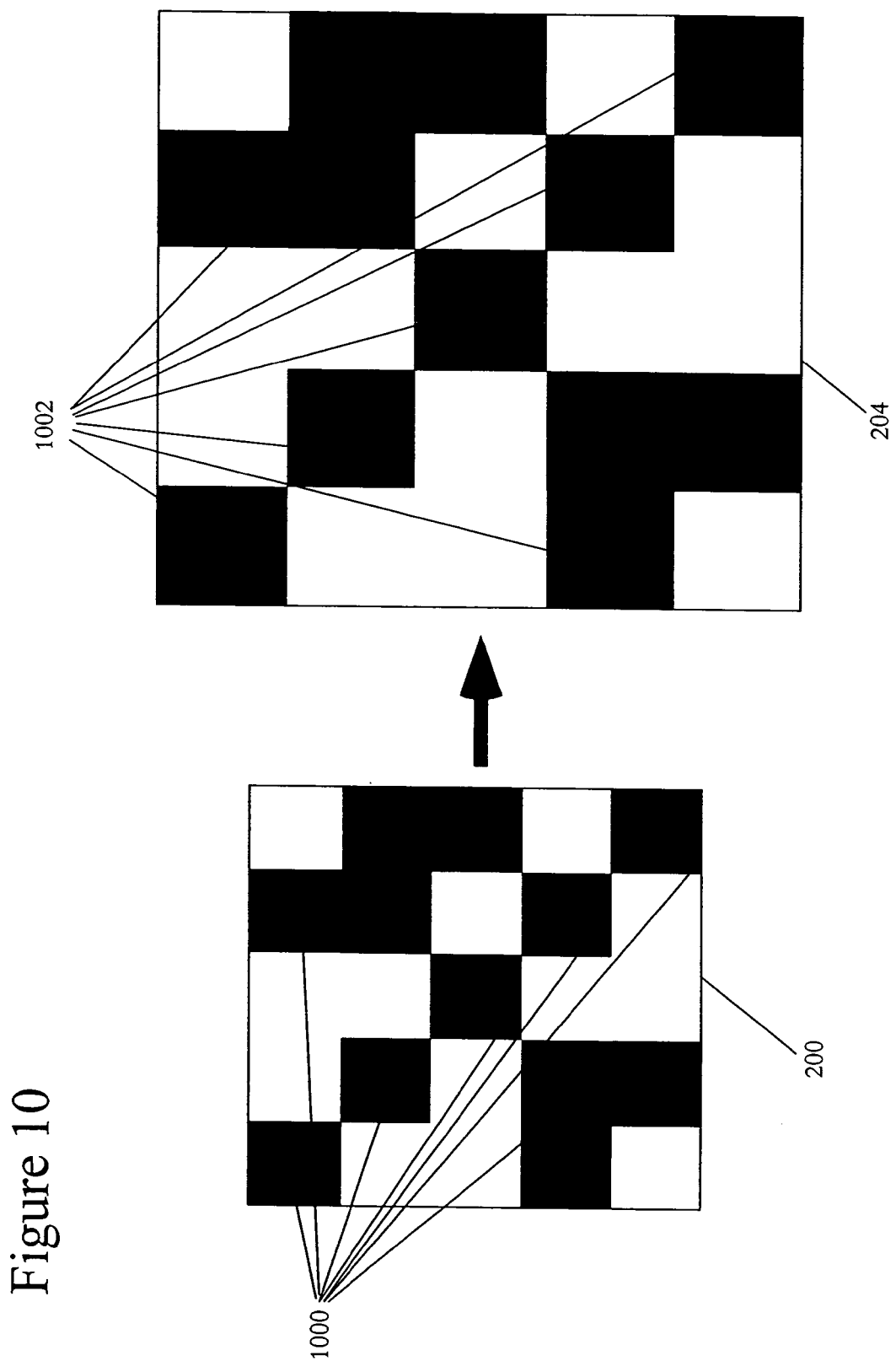
FIG. 10 is a front plan drawing of an exemplary elastic two dimensional binary amplitude mask illustrating how it may be expanded along both the X and Y axes.

FIG. 10 illustrates an exemplary variable two dimensional binary amplitude mask. Before stretching, unstretched elastic amplitude mask 1000, which is formed on unstretched elastic substrate 200, makes up a first two dimensional binary amplitude mask, with a desired diffraction pattern for a given wavelength. Unstretched elastic amplitude mask 1000 is desirably formed of a number of square opaque regions formed in predetermined locations of a matrix pattern. These square opaque regions may be separate or contiguous with other square opaque regions. FIG. 10 also illustrates how the substrate may be stretched so that two dimensionally stretched elastic substrate 204 and two dimensionally stretched elastic amplitude mask 1002 form a new two dimensional binary amplitude mask, with a new diffraction pattern for the given wavelength. Alternatively, this new two dimensional binary amplitude mask may be viewed as having the same diffraction pattern as unstretched elastic amplitude mask 1000, but being optimized for a new longer wavelength. Although two dimensionally stretched elastic amplitude mask 1002 is illustrated in FIG. 10 as being stretched equally along the X and Y axes, it may be understood by one skilled in the art that the amount of stretching in these two directions need not be equal, depending on the desired effect on the diffraction pattern.

Figure 4:
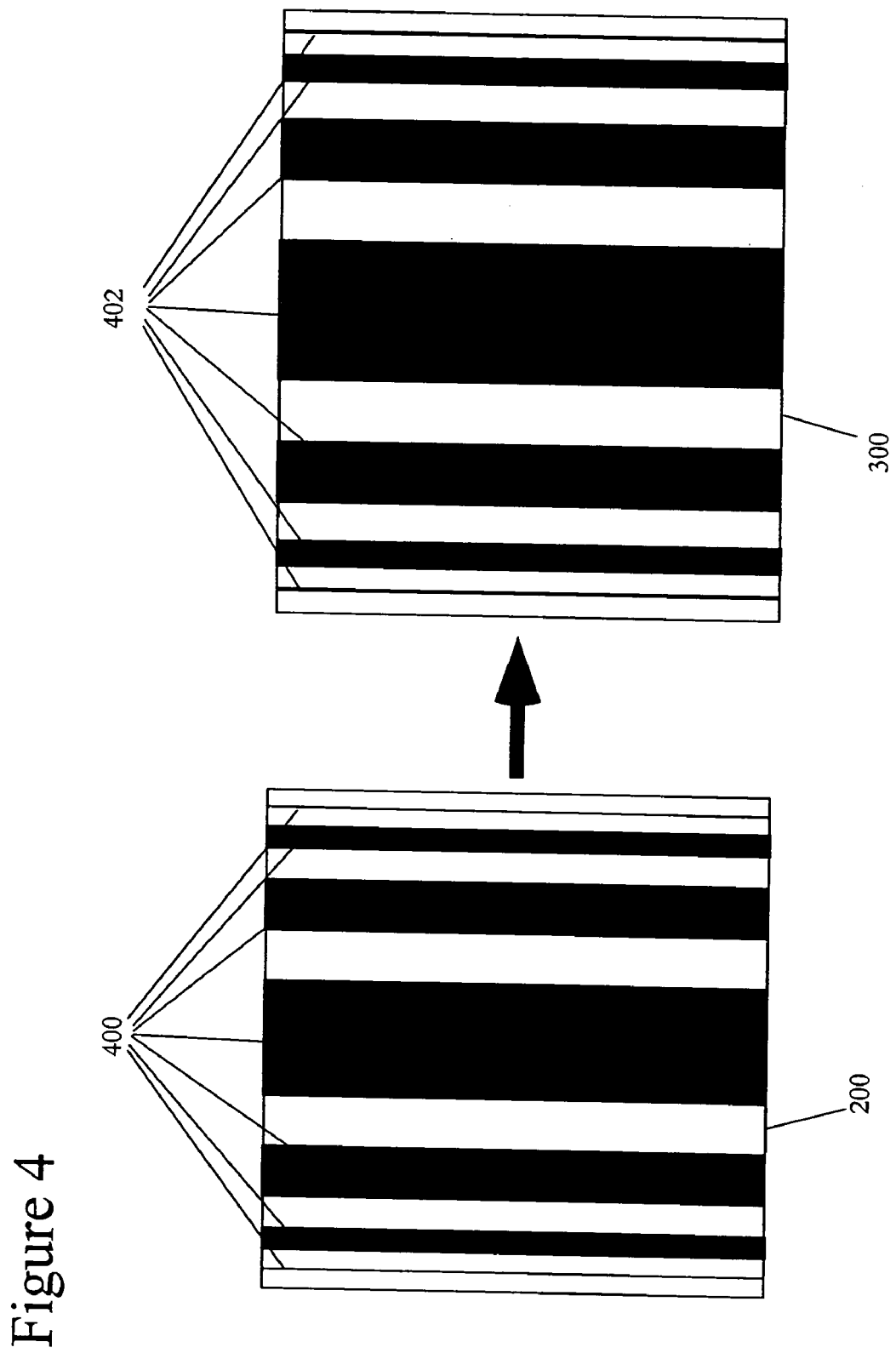
FIG. 4 is a front plan drawing of an exemplary elastic one dimensional Fresnel zone plate illustrating its expansion along the X axis.

FIG. 4 illustrates an exemplary elastic one dimensional Fresnel zone plate which may function as a variable focal length (and/or variable wavelength) cylindrical diffractive lens. Similar to the exemplary two dimensional Fresnel zone plate of FIGS. 2 and 3, before stretching, unstretched elastic amplitude grating 400 is formed on unstretched elastic substrate 200 to have an initial focal length for a given wavelength. The substrate may then be stretched so that stretched elastic substrate 300 and stretched elastic amplitude grating 402 form a new cylindrical diffractive lens, with a new longer focal length for the given wavelength. Alternatively, this new cylindrical diffractive lens may be viewed as having the same focal length as initially, but being optimized for a new longer wavelength.

Figure 5:
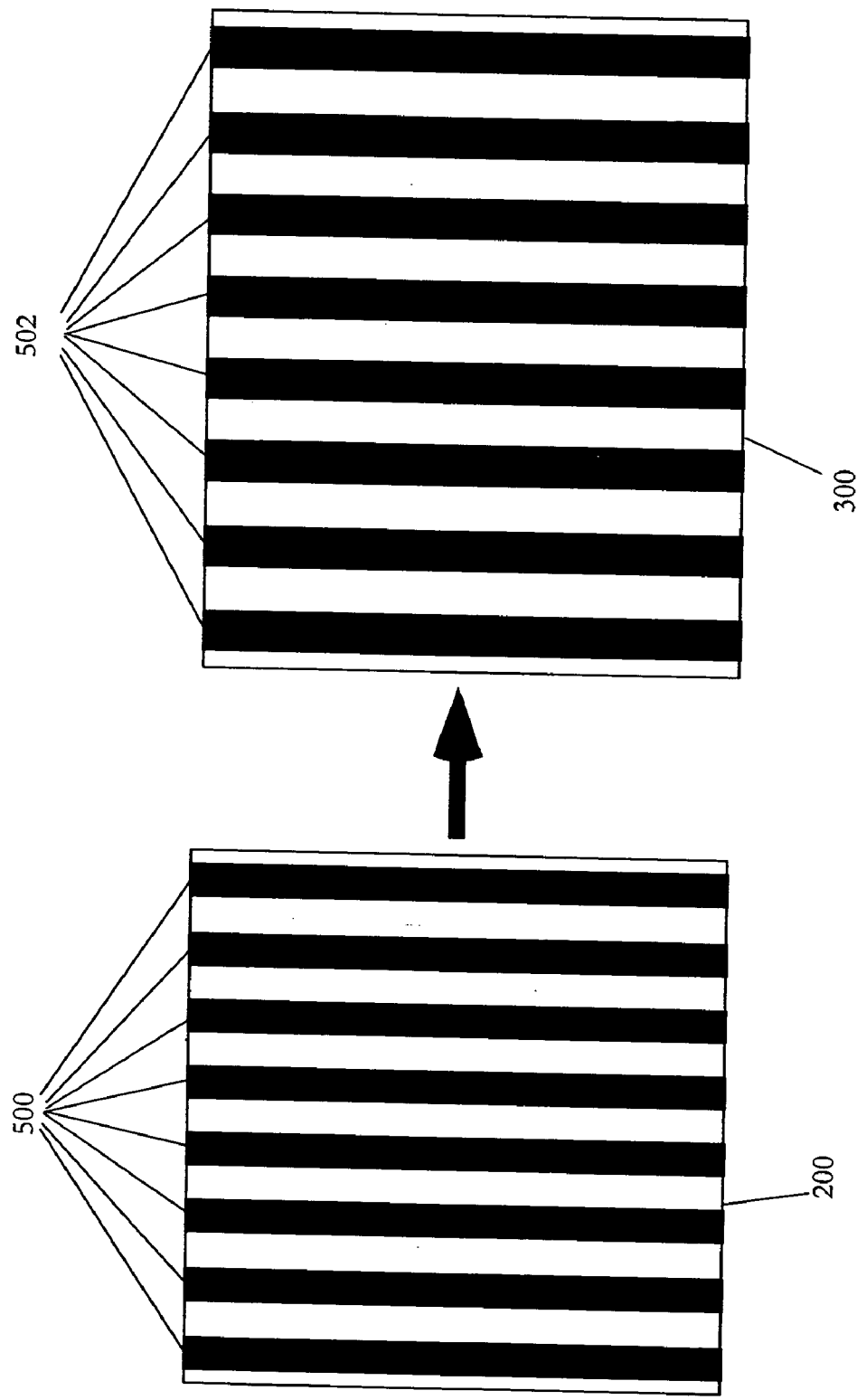
FIG. 5 is a front plan drawing of an exemplary elastic diffraction grating illustrating its expansion along the X axis.

FIG. 5 illustrates an exemplary variable diffraction grating in which unstretched elastic amplitude grating 500 is formed on unstretched elastic substrate 200 as a plurality of substantially parallel lines. These lines are shown as equally spaced in FIG. 5, but it is contemplated that these lines may unequally spaced to form a chirped or other type of diffractive grating. The grating formed by unstretched elastic amplitude grating 500 has an initial grating period and when the grating is stretched along a linear axis substantially perpendicular to its substantially parallel lines this grating period is varied, as illustrated by stretched elastic amplitude grating 502.

Figure 6:
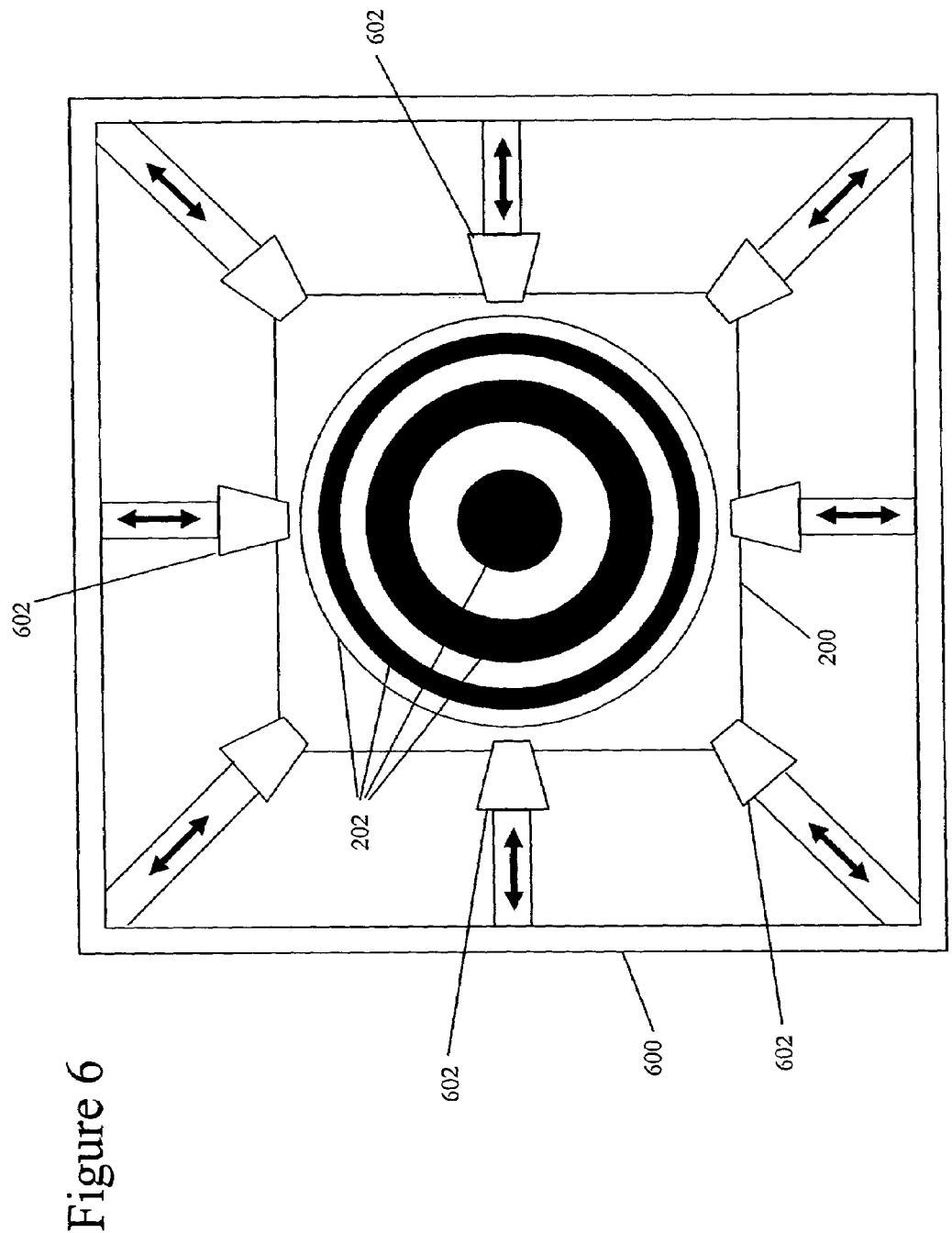
FIG. 6 is a front plan drawing of an exemplary elastic two dimensional Fresnel zone plate and substrate mount illustrating an exemplary variable tensioner according to the present invention.

FIG. 6 illustrates an exemplary substrate mount to hold and stretch elastic substrate 200. The exemplary substrate mount includes body 600 and a number of variable tensioners 602. Each variable tensioner includes a holder that is coupled to elastic substrate 200 to hold elastic substrate 200 under tension. Variable tensioners 602 may controllably move in or out to change the amount that elastic substrate 200 is stretched. They may be mechanical or piezoelectric motion stages, screws, or other variable tensioning means.

In this exemplary drawing, elastic substrate 200 is rectangular (i.e. polygonal). It is noted that the holders of variable tensioners 602 may desirably be coupled to elastic substrate 200 on the sides, at the corners, both of a polygonal substrate, as shown in FIG. 6. The plurality of variable tensioners shown in FIG. 6 may be used to stretch elastic amplitude grating 202 into more complex shapes than the examples shown in FIGS. 2 and 3. This may allow for an adaptive optical lens to correct disturbances in an incident beam, such as those that may be cause by extended transmission through the atmosphere, or water.

Alternatively, for an elastic substrate that is to be stretched along only one axis, it may be desirable for only the two sides perpendicular to the stretching axis to be held. It is also noted that it is not necessary for every one of the holders to be at the end of variable tensioner. Some tensioners may be static. For circular elastic substrates, it may be desirable for the holders of variable tensioners 602 to be coupled to elastic substrate at equal angular spacings and adapted to move radially.

FIGS. 7A and 7B illustrates an alternative variable tensioning method which includes frame 700 over which elastic substrate may be stretched like a drumhead. One skilled in the art may understand that, although only two parallel frame bars are shown in FIGS. 7A and 7B, other polygonal or circular frame shapes may be used.

FIGS. 8A and 8B illustrates another alternative variable tensioning method which includes osculating roller pairs 800. These figures also illustrate alternative variable thickness elastic substrate 802. These osculating roller pairs grip variable thickness elastic substrate 802 frictionally and may rotate synchronously in opposite directions to stretch the elastic substrate. It is noted that, although only two osculating roller pairs 800 are shown in FIGS. 8A and 8B, additional osculating roller pairs may be used to stretch an elastic substrate along additional axes. It may also be noted that only one osculating roller pair is necessary to stretch an elastic substrate along a given axis.

Variable thickness elastic substrate 802 illustrates one manner in which the elasticity of the elastic substrate may be varied over the substrate surface. Such a variation in elasticity may be desirable to distort the shape of the amplitude grating during stretching. For example, variable thickness elastic substrate 802 may allow the grating period of the diffraction grating formed by amplitude grating 500 to be variably chirped. A similar variable elasticity substrate may be used in the embodiments of FIGS. 2 and 3 to allow variable asphericity lens to be produced.

Figure 9:
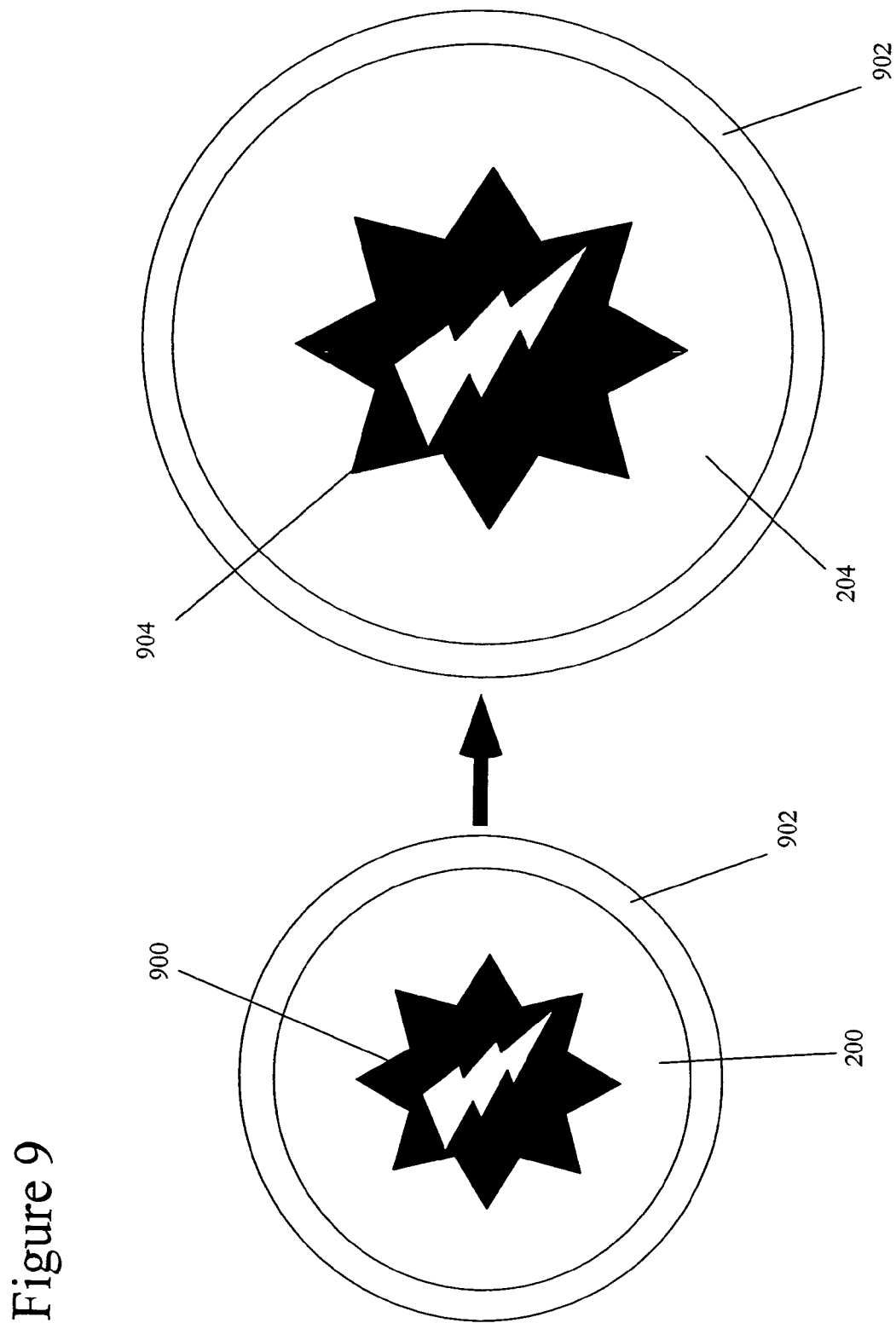
FIG. 9 is a front plan drawing of an exemplary elastic amplitude mask and substrate mount illustrating a further alternative exemplary variable tensioner according to the present invention.

FIG. 9 illustrates a further alternative variable tensioning method. This alternatively tensioning method uses expandable frame 902, which coupled to elastic substrate 200. Expandable frame 902 is adapted to vary a length of at least a portion of its perimeter, thus, stretching elastic substrate 900. Expanding frame 902 may expand by a mechanical telescoping means, piezoelectrically, or through other means. It is noted that, although expandable frame 902 is shown as an annular ring adapted to vary in circumference in FIG. 9, expandable frame 902 may also be formed as a polygonal shape in which the length of one or more of the sides may vary.

FIG. 9 also includes exemplary unstretched elastic mask 900 and stretched elastic mask 904 which are formed of opaque material on the elastic substrate. This exemplary mask illustrates only one potential mask shape that may be expanded or distorted using the approach of the present invention. Such an elastic amplitude mask may be used to scale and/or distort the resulting image formed by light passed through the elastic mask.

The present invention includes exemplary dynamically variable, amplitude grating based diffractive optics. Although the invention is illustrated and described herein with reference to specific embodiments, the invention is not intended to be limited to the details shown. Rather, various modifications may be made in the details within the scope and range of equivalents of the claims and without departing from the invention. In particular, although the elastic amplitude gratings and masks are described above and illustrated as formed on the surface of the elastic substrates, it is contemplated that they may be formed within the elastic substrates as well, without departing from the invention.

What is claimed:

1. A dynamically variable, amplitude grating based diffractive optic comprising:
   a substantially transmissive, elastic substrate including a first surface;
   a substantially opaque, elastic material formed in a predetermined pattern on the first surface of the substantially transmissive, elastic substrate in a plane parallel to the first surface of the substrate, the predetermined pattern forming an amplitude grating; and
   a substrate mount coupled to the substantially transmissive, elastic substrate to hold the substantially transmissive, elastic substrate under tension, the substrate mount including a variable tensioner to stretch the substantially transmissive, elastic substrate and the substantially opaque, elastic material, thereby allowing at least one optical property of the amplitude grating to be dynamically varied.

2. The dynamically variable, amplitude grating based diffractive optic according to claim 1, wherein the substantially transmissive, elastic substrate is at least one of:
   a sheet of polypropylene film;
   a sheet of impact modified polypropylene film;
   a sheet of polyvinylchloride film;
   a sheet of polyethylene film;
   a sheet of polyurethane film;
   a sheet of melt processible rubber film;
   a sheet of thermoplastic vulcanate film;
   a sheet of thermoplastic copolyester film;
   a sheet of thermoplastic polyamide film;
   a sheet of ethylene vinyl acetate film; or
   a sheet of styrene block copolymer film.

3. The dynamically variable, amplitude grating based diffractive optic according to claim 1, wherein:
   the substantially transmissive, elastic substrate is circular;
   the variable tensioner includes a plurality of equally angularly spaced holders coupled to the substantially transmissive, elastic substrate; and
   each equally angularly spaced holder is adapted to move radially to stretch the substantially transmissive, elastic substrate and the substantially opaque, elastic material.

4. The dynamically variable, amplitude grating based diffractive optic according to claim 1, wherein:
   the substantially transmissive, elastic substrate is polygonal;
   the variable tensioner includes a plurality of holders, each holder coupled to the substantially transmissive, elastic substrate at one of a side or a corner; and
   at least one of the plurality of holders adapted to move linearly to stretch the substantially transmissive, elastic substrate and the substantially opaque, elastic material.

5. The dynamically variable, amplitude grating based diffractive optic according to claim 1, wherein:
the variable tensioner includes a frame coupled to the substantially transmissive, elastic substrate; and
the frame is adapted to vary a length of at least a portion of a perimeter of the frame to stretch the substantially transmissive, elastic substrate and the substantially opaque, elastic material.

6. The dynamically variable, amplitude grating based diffractive optic according to claim 5, wherein:
the frame is an annular ring; and
the annular ring is adapted to vary in circumference.

7. The dynamically variable, amplitude grating based diffractive optic according to claim 1, wherein:
the substrate mount further includes a frame;
the variable tensioner includes a plurality of holders coupled to the substantially transmissive, elastic substrate; and
at least one of the plurality of holders is adapted to move linearly to stretch the substantially transmissive, elastic substrate over the frame.

8. The dynamically variable, amplitude grating based diffractive optic according to claim 1, wherein:
the variable tensioner includes a plurality of rollers arranged in at least one osculating roller pair;
the substantially transmissive, elastic substrate is held between the rollers of the at least one osculating roller pair; and
the rollers of the at least one osculating roller pair rotate synchronously in opposite directions to stretch the substantially transmissive, elastic substrate.

9. The dynamically variable, amplitude grating based diffractive optic according to claim 1, wherein the substantially opaque, elastic material is at least one of ink, photoresist, epoxy, elastomer, rubber, resin, or thermoplastic.

10. The dynamically variable, amplitude grating based diffractive optic according to claim 1, wherein:
the predetermined pattern includes a plurality of concentric annular regions; and
the amplitude grating formed by the predetermined pattern is a two dimensional Fresnel zone plate.

11. The dynamically variable, amplitude grating based diffractive optic according to claim 10:
wherein the variable tensioner stretches the plurality of concentric annular regions along a linear axis into concentric elliptical annular regions;
whereby the two dimensional Fresnel zone plate functions as a variable ellipticity elliptical lens.

12. The dynamically variable, amplitude grating based diffractive optic according to claim 10:
wherein the variable tensioner stretches the plurality of concentric annular regions along at least two linear axes;
whereby the two dimensional Fresnel zone plate functions as a variable focal length lens.

13. The dynamically variable, amplitude grating based diffractive optic according to claim 1, wherein the predetermined pattern includes a plurality of substantially parallel lines.

14. The dynamically variable, amplitude grating based diffractive optic according to claim 13:
wherein;
the amplitude grating formed by the predetermined pattern is a one dimensional Fresnel zone plate; and
the variable tensioner stretches the amplitude grating along a linear axis substantially perpendicular to the plurality of substantially parallel lines;
whereby the one dimensional Fresnel zone plate functions as a variable focal length cylindrical lens.

15. The dynamically variable, amplitude grating based diffractive optic according to claim 13 wherein:
the amplitude grating formed by the predetermined pattern is a diffraction grating having a grating period; and
the variable tensioner stretches the amplitude grating along a linear axis substantially perpendicular to the plurality of substantially parallel lines to vary the grating period of the diffraction grating.

16. The dynamically variable, amplitude grating based diffractive optic according to claim 1, wherein the substantially transmissive, elastic substrate has an elasticity parallel to the first surface that varies between locations on the first surface in a predetermined pattern.

17. The dynamically variable, amplitude grating based diffractive optic according to claim 1, wherein the substantially transmissive, elastic substrate has a thickness normal to the first surface that varies between locations on the first surface in a predetermined pattern.

18. The dynamically variable, amplitude grating based diffractive optic according to claim 1, wherein:
the predetermined pattern includes a plurality of concentric annular regions; and
the amplitude grating formed by the predetermined pattern functions as a variable aspherical lens.

19. The dynamically variable, amplitude grating based diffractive optic according to claim 1, wherein:
the predetermined pattern includes a plurality of substantially square regions; and
the amplitude grating formed by the predetermined pattern functions as a binary amplitude mask.

20. The dynamically variable, amplitude grating based diffractive optic according to claim 19, wherein at least two of the plurality of substantially square regions are contiguous.

21. A dynamically variable, amplitude grating based diffractive optic comprising:
an elastic substrate including a surface and at least one substantially transparent portion and at least one substantially opaque portion, the at least one substantially opaque region arranged in a predetermined pattern to form an amplitude grating; and
a substrate mount coupled to the elastic substrate to hold the elastic substrate under tension, the substrate mount including a variable tensioner to stretch the elastic substrate in a plane parallel to the first surface of the substrate, thereby allowing at least one optical property of the amplitude grating to be dynamically varied.

* * * * *

UNITED STATES PATENT AND TRADEMARK OFFICE
CERTIFICATE OF CORRECTION

| | | |
|---|---|---|
| PATENT NO. | : 7,136,227 B2 | Page 1 of 1 |
| APPLICATION NO. | : 10/912886 | |
| DATED | : November 14, 2006 | |
| INVENTOR(S) | : Ming Li | |

It is certified that error appears in the above-identified patent and that said Letters Patent is hereby corrected as shown below:

Claim 1 at column 6;

Insert beginning at line 23:

-- determined pattern on the first surface of the substantially transmissive, elastic substrate, the predetermined pattern forming an amplitude grating; and --

Insert beginning at line 32:

-- substantially opaque, elastic material, in a plane parallel to the first surface of the substrate thereby allowing at least one optical property of the amplitude grating to be dynamically varied. --

Signed and Sealed this

Twenty-fifth Day of September, 2007

JON W. DUDAS
*Director of the United States Patent and Trademark Office*